(12) United States Patent
Kozlowski

(10) Patent No.: US 10,001,982 B1
(45) Date of Patent: Jun. 19, 2018

(54) IMPOSING A COMMON BUILD SYSTEM FOR SERVICES FROM DISPARATE SOURCES

(71) Applicant: Palantir Technologies, Inc., Palo Alto, CA (US)

(72) Inventor: Tom Kozlowski, New York, NY (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days. days.

(21) Appl. No.: 15/382,493

(22) Filed: Dec. 16, 2016

(51) Int. Cl.
| | |
|---|---|
| *G06F 9/445* | (2018.01) |
| *G06F 9/45* | (2006.01) |
| *G06F 9/455* | (2018.01) |
| *H04L 29/08* | (2006.01) |
| *G06F 9/44* | (2018.01) |

(52) U.S. Cl.
CPC ............... *G06F 8/61* (2013.01); *G06F 9/455* (2013.01); *H04L 67/10* (2013.01); *G06F 8/38* (2013.01)

(58) Field of Classification Search
CPC ..... G06F 8/38; G06F 8/40; G06F 8/61; G06F 9/455; H04L 67/10
USPC ................ 717/101–103, 136–137, 175–178
See application file for complete search history.

(56) References Cited

U.S. PATENT DOCUMENTS

| | | | |
|---|---|---|---|
| 6,058,373 A | 5/2000 | Blinn et al. | |
| 7,685,109 B1 | 3/2010 | Ransil et al. | |
| 8,285,860 B2 | 10/2012 | McGuire et al. | |
| 8,819,106 B1 | 8/2014 | Sirota et al. | |
| 8,850,528 B2 | 9/2014 | Van Biljon et al. | |
| 9,256,657 B1 | 2/2016 | Evenson et al. | |
| 9,444,800 B1 * | 9/2016 | Roth | H04L 67/10 |
| 9,507,579 B2 * | 11/2016 | Gambardella | H04L 65/80 |
| 9,521,194 B1 | 12/2016 | Gabrielson | |
| 9,740,543 B1 * | 8/2017 | Savage | G06F 9/4421 |
| 2004/0044727 A1 | 3/2004 | Abdelaziz et al. | |
| 2005/0228711 A1 | 10/2005 | Lahey et al. | |
| 2007/0005801 A1 | 1/2007 | Kumar et al. | |
| 2007/0105597 A1 | 5/2007 | Hwang | |

(Continued)

*Primary Examiner* — Ted T Vo
(74) *Attorney, Agent, or Firm* — Elliot H. Karlin; Hickman Palermo Becker Bingham LLP

(57) ABSTRACT

Techniques for imposing a common build system for disparate software products are described. In an embodiment, a first virtualization environment and second visualization environment are generated for a first software product and a second software product respectively. The virtualization environments include one or more script files identifying steps to take to build an executable package for the first software product and the second software product respectively. An API endpoint is defined for an output of the first virtualization environment. When a first generic build command is received through a first user interface associated with the first software product, the first generic build command is translated into a first software specific build command. The first virtualization environment then executes the first software build command using the one or more script files. When the first generic build command is received through a second user interface associated with the second software product, the first generic build command is translated into a second software specific build command. The second virtualization environment then executes the second software build command using the one or more script files.

16 Claims, 4 Drawing Sheets

(56) References Cited

U.S. PATENT DOCUMENTS

| | | |
|---|---|---|
| 2007/0168336 A1 | 7/2007 | Ransil et al. |
| 2009/0132317 A1 | 5/2009 | Dholakia et al. |
| 2009/0132710 A1 | 5/2009 | Pelley |
| 2010/0057515 A1 | 3/2010 | Gandini et al. |
| 2010/0186020 A1 | 6/2010 | Maddhirala et al. |
| 2010/0235525 A1 | 9/2010 | McGuire et al. |
| 2011/0131448 A1 | 6/2011 | Vasil et al. |
| 2012/0180068 A1 | 7/2012 | Wein et al. |
| 2014/0310328 A1 | 10/2014 | Charif et al. |
| 2014/0310720 A1 | 10/2014 | Song et al. |
| 2014/0379777 A1 | 12/2014 | Yamamoto et al. |
| 2015/0172412 A1 | 6/2015 | Escriva et al. |
| 2017/0285981 A1 | 10/2017 | DeArment et al. |
| 2017/0285982 A1 | 10/2017 | DeArment et al. |

\* cited by examiner

US 10,001,982 B1

IMPOSING A COMMON BUILD SYSTEM FOR SERVICES FROM DISPARATE SOURCES

FIELD OF THE DISCLOSURE

The present disclosure relates to computer program development and build processes useful in distributed computing systems. More specifically, the example embodiment(s) described below relate to a common build system for disparate types of software.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Certain software deployment products allow deployment and management of products through a single system. For example, a host product may take a plurality of other products, including binaries and configuration files, and install them onto host computing devices. The deployed products are generally managed by a single source. Thus, they can be packaged in a way that the deployment product understands, thereby allowing uniformity in the way they are deployed and managed.

However, some products deployed through the deployment products contain dependencies on additional software, such as open source software, which is not packaged in a manner that is readily understood by the deployment product. While this additional software may be important to the host computing devices, installing the additional software would generally require installing the software outside of the deployment product or manually configuring the software to be compatible with the deployment product. In either scenario, the convenience of the deployment products is lost when a host intends to install additional software.

Additionally, when software is installed through a deployment product, the ease of performing tests on the installation is greatly reduced due to the standardization of the tests for all deployed products. When software is installed outside of the deployment product, tests of the software's performance must also be manually installed. The added difficulty of finding and installing tests for each installed software package often leads to tests not being performed after a product has been installed, thus leading to improperly installed software.

Thus, there is a need for a system that repackages software received from disparate sources so that the software can be deployed through the same software deployment product.

SUMMARY

The appended claims may serve as a summary of the invention.

DETAILED DESCRIPTION

Figure 1:
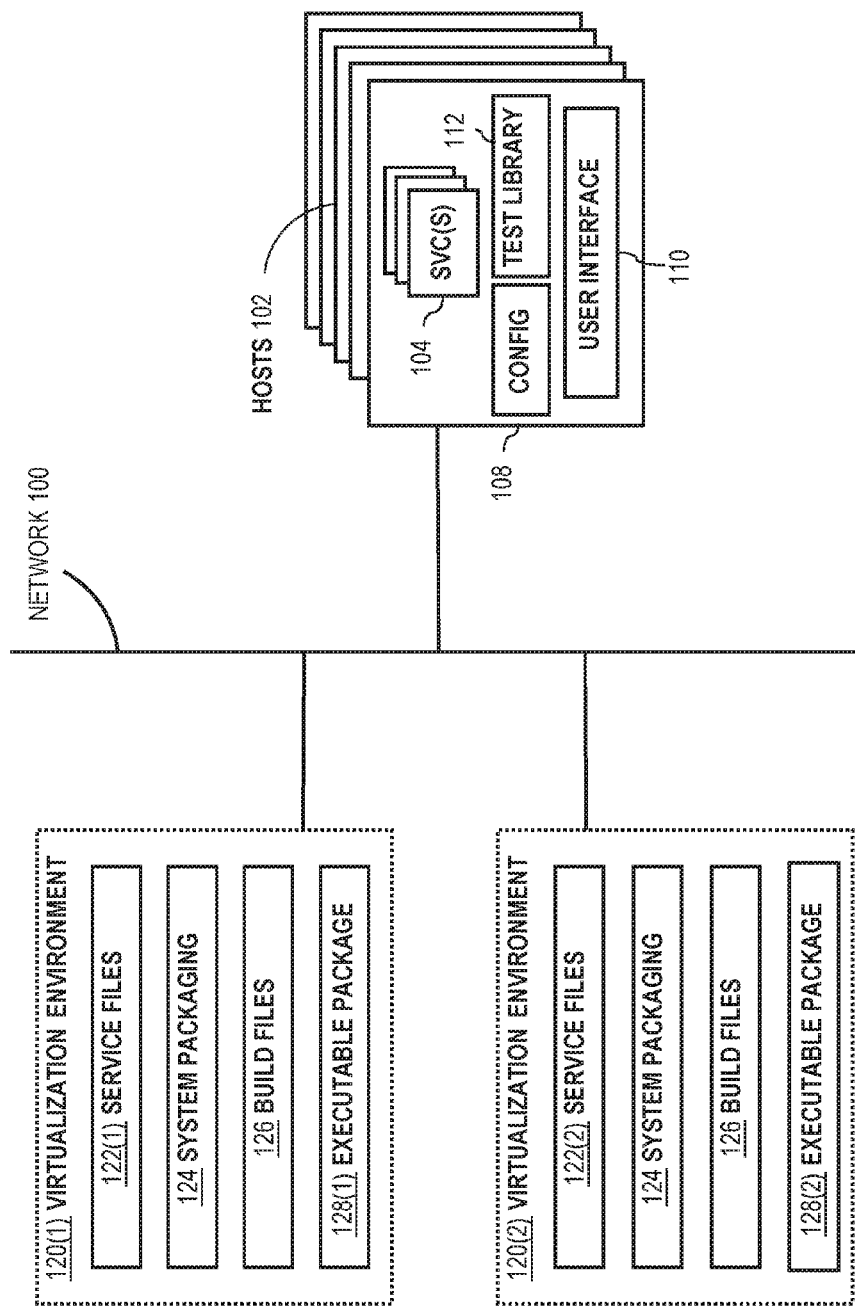
FIG. 1 depicts a schematic diagram of a distributed computing system for providing a plurality of services installed on a cluster of a plurality of hosts in a distributed computing environment.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Embodiments are described in sections below according to the following outline:
1. GENERAL OVERVIEW
2. DISTRIBUTED COMPUTING ENVIRONMENT
3. VIRTUALIZATION ENVIRONMENTS
4. PREPARING FILES FOR COMMON BUILD IMPLEMENTATION
5. IMPLEMENTING THE COMMON BUILD FOR DIFFERENT SERVICES
6. IMPLEMENTATION EXAMPLE—HARDWARE OVERVIEW
7. IMPLEMENTATION EXAMPLE—BASIC SOFTWARE SYSTEM
8. EXTENSIONS AND ALTERNATIVES 1. General Overview Techniques for executing a common computer program build process and system for disparate computer-implemented services are described. "Build," in this context, has the meaning ordinarily used in professional software development, such as to perform a process of compiling, interpreting, parsing, linking and similar steps to transform computer program source code or scripts into executable code. A service, in this context, can be a single instance of a software product or software application that is installed on one or more hosts in the distributed computing environment. For example, a service might be a database server instance, a web server instance, or any other instance of a software product or a software application installed on one or more hosts. Often, a service is a network "server" service in that it responds to network requests from other network "client" services. A service can be both a server service and a client service, or just a client service, or just a server service. Further, a service can be, but need not be, a network service. That is, a service may perform operations at one or more hosts without sending or responding to network requests.

A host can be a single computing device in one implementation. For example, a host can be a single server-computing device. Alternatively, a host can be a single virtual computer instance that executes on a computing device facilitated by a virtualization layer (e.g., a Type 1 or Type 2 hypervisor) interposed between the virtual computer instance and the computing device. Regardless if a single computing device or a single virtual computer instance, a host can be configured with an operating system (e.g., UNIX, LINUX, or WINDOWS) that manages the low-level aspects of host operation including managing execution of processes, memory allocation, file input and output (I/O), and device I/O. A host may also be configured with a container platform for running services within containers on the operating system.

The distributed environment can be one or more data center facilities or other computer hosting facilities connected to the Internet or other public or private network. Services that execute as processes on hosts in the distributed computing environment may be configured using the distributed configuration platform described herein or in application Ser. No. 14/284,959, filed Oct. 4, 2016, the entire contents of which is hereby incorporated by reference as if fully set forth herein.

In one embodiment, programmed instructions define and create a virtualization environment for building particular projects and includes a script file that specifies steps to take to build an executable package for a particular software product. An API endpoint is defined for the output of a process running in the virtualization environment. When a build command is received, the system identifies the virtualization environment for the corresponding first software, builds the first software in the virtualization environment based on the script file, and produces a first archive file for distribution. The build command is the same for any software product that uses the system, while the script files are product-specific. If the same build command is received through a second software template, the system identifies the virtualization environment for corresponding second software, builds the second software in the virtualization environment according to a second build script that may be different than the first, and produces a second archive file for distribution.

In an embodiment, a method comprises generating a first virtualization environment for a first software product comprising one or more first script files identifying steps to take to build an executable package for the first software product; defining an API endpoint for an output of the first virtualization environment; receiving, through a first user interface associated with the first software product, a first generic build command; translating the first generic build command into a first software specific build command; using the one or more script files, executing the first software specific build command in the first virtualization environment; generating a second virtualization environment for a second software product comprising one or more script files identifying steps to take to build an executable package for the second software product; defining an API endpoint for an output of the second virtualization environment; receiving, through a second user interface associated with the second software product, the first generic build command; translating the first generic build command into a second software specific build command; using the one or more second script files, executing the second software specific build command in the second virtualization environment; wherein the method is performed using one or more processors. "Generic build command," in this context, indicates that the same form of build command can be used for building software executables that are based on any of several different source languages or programming environments.

In an embodiment, a system comprises one or more processors; one or more storage media storing: a first virtualization environment for building a first software package, the first virtualization environment comprising: one or more first service files for a first software product; build instructions for building software products in a virtualization environment; system packaging instructions for configuring a software product to meet one or more specifications of a software deployment product; and an API endpoint for outputting an executable software package built from the one or more first service files using the build instructions; and a second virtualization environment for building a second software package, the second virtualization environment comprising: one or more second service files for a second software product; the build instructions for building software products in a virtualization environment; the system packaging instruct configuring a software product to meet one or more specifications of the software deployment product; and an API endpoint for outputting an executable software package built from the one or more second service files using the build instructions.

2. Distributed Computing Environment

FIG. 1 depicts a schematic diagram of a distributed computing system. In an embodiment, the system 100 is programmed or configured for providing a plurality of services 104 installed on a cluster of a plurality of hosts (collectively, "hosts 102," or generally or singularly, "host 102") in a distributed computing environment. The distributed computing environment can be within one or more data center or other hosting facilities connected to a network such as, for example, the Internet or other network. However, the distributed computing environment is not limited to being within a data center or hosting facility environment and can be another type of distributed computing environment such as within a networked home, office, or campus. Any number of hosts may be used in different embodiments.

A service 104 can be a single instance of a software product or software application installed on at least one of the hosts 102. For example, a service 104 might be a database server instance, a web server instance, or any other instance of a software product or a software application installed on one or more of the hosts 102. Multiple different services 104 may be installed on the hosts 102 including multiple different services 104 on the same host 102. For example, a service 104 may be installed on multiple of the hosts 102 in a distributed, clustered, load balanced, or failover computing arrangement.

A host 102 can be a single computing device such as, for example, computing device 300 described below with respect to FIG. 3. Alternatively, a host 102 can be a single virtual computer instance that executes on a computing device (e.g., device 300) facilitated by a virtualization layer interposed between the virtual computer instance and the computing device. The virtualization layer can be a virtual machine monitor such as, for example, virtual machine monitor 430 described below with respect to FIG. 4. Regardless if a single computing device or a single virtual computer instance, a host 102 can be configured with an operating system such as, for example, operating system 410 described below with respect to FIG. 4. The operating system of a host 102 can manage low-level aspects of the host's 102 operation including managing execution of processes, memory allocation, file input and output (I/O), and device I/O. A host 102 may also be configured with a container platform for running services 104 within containers on the operating system of the host.

The network 120 can connect the hosts 102 together within the distributed computing environment. Network 120 can actually be composed of multiple sub-networks connected together. For example, the network 120 can be an Internet Protocol Version 4-based and/or an Internet Protocol Version 6-based wired or wireless network or a combination of multiple such networks.

While in some example embodiments, each host 102 in the cluster is configured with configuration instructions 108, test library instructions 112, and user interface instructions 110, a host 102 may be configured with less than all of these service configuration instructions or different service configuration instructions in other examples. Thus, there is no requirement that each host 102 be configured with each and every or any of the instructions 108, 110, and 112.

According to some example embodiments, each host 102 in the cluster executes configuration instructions 108. The configuration instructions 108, when executed at a host 102, provide an application programming interface (API) to services 104 executing on the host 102 for reading and writing service configuration information from and to the host 102.

According to some example embodiments, the services 104 on a host 104 invoke the API of the configuration module 108 in a Representational State Transfer (REST) style using the HyperText Transfer Protocol (HTTP) or the Secure-HyperText Transfer Protocol (HTTPS). However, the example embodiments are not limited to REST-style invocation and other invocation styles may be used. Nor are the example embodiments limited to the HTTP or HTTPS protocols and other application layer protocol may be used.

According to some example embodiments, for added security, the API provided by the configuration instructions 108 is available to services 104 at a host 102 only on a localhost network interface of the host 102.

According to an embodiment, a user interface 110 executes on a host 102. The user interface 110 contains options for installing one or more services to be accessible to host 102. The user interface 110 may include an identification of a particular service associated with the user interface 110 at the time a command, such as a generic build command, is entered through the user interface. User interface 110 may be further configured to forward the generic build command to a virtualization environment that has been generated for the particular service.

According to an embodiment, a host 102 contains a generic test library 112 comprising one or more tests that may be applied to executable applications received from the virtualization environment. For example, one test may determine whether an output of a virtualization environment matches a specification for a particular distributed environment.

3. Virtualization Environments

In an embodiment, virtualization environments are generated for preparing services for installation. The virtualization environment may comprise a programmatic container which includes a server instance along with applications and libraries necessary to run the server instance. Each virtualization environment may be a standalone environment which runs independent of the other virtualization environments. In FIG. 1, virtualization environment 120(1) is a virtualization environment for preparing an executable package of a first service and virtualization environment 120(2) is a virtualization environment for preparing an executable package of a second service.

In an embodiment, virtualization environments 120(1) and 120(2) are stored on a single server computing device which interacts with hosts 102 over network 100. Virtualization environments 120(1) and 120(2) may also be stored on separate server computing devices. Based on which service a host 102 is attempting to install, host 102 may select a server computer which stores the virtualization environment associated with the service. Additionally and/or alternatively, one or more virtualization environments may be stored on one or more of hosts 102, but run independently from other services stored on the one or more of hosts 102.

Virtualization environment 120(1) contains service files 122(1), system packaging 124, build files 126, and executable package 128(1). Virtualization environment 120(2) contains service files 122(2), system packaging 124, build files 126, and executable package 128(2). Service files 122(1) and 122(2) are software files for the first service and the second service respectively. For example, service files 122(1) may include an installation package for the first service. The installation package may include build files, necessary libraries, dependencies, and/or documentation for the first service.

In an embodiment, generating virtualization environment 120(1) and 120(2) comprises storing service files 122(1) and 122(2) in the respective virtualization environments. Alternatively, virtualization environment 120(1) may contain a service that is configured to procure the service files prior to performing a build operation. For example, upon receiving a build command, the virtualization environment may execute one or more sets of instructions that cause the virtualization environment to connect to an API of a web service associated with the first service in order to request service files 122(1). After the files have been downloaded, the virtualization environment may perform build operations using the downloaded files.

Both virtualization environments 120(1) and 120(2) contain system packaging 124. System packaging 124 comprises one or more files necessary to incorporate services into a distributed computing system. For example, system packaging 124 may include configuration files and additional documentation that is used to meet specification requirements of a software deployment product used by a distributed computing system. By including system packaging 124 in virtualization environments 120(1) and 120(2), the distributed computing system is able to deploy software packages from disparate sources through a similar interface or template.

While service files 122(1) and 122(2) are distinct for each virtualization environment because they relate to different services, system packaging 124 may be universally stored in each virtualization environment because system packaging 124 relates to a deployment specification and may be service agnostic. Additionally and/or alternatively, system packaging 124 may contain different files for different virtualization environments based on the service files for the virtualization environment. For example, if service files 122(1) contain one or more files that would usually be included in system packaging 124, system packaging 124 of virtualization environment 120(1) may not contain the one or more files. On the other hand, if service files 122(2) do not contain the one or more files, then the one or more files would be included in system packaging 124 of virtualization environment 120(2).

In an embodiment, generating virtualization environments 120(1) and 120(2) comprises storing build files 126. Build files 126 impose a common build system for generating an executable software package from one or more service files. Build files may include a build automation system which is configured to perform software builds on disparate types of software packages. In each virtualization environment 120, service files 122 may be mapped to build files 124. For example, service files 122 may be stored in a build directory of each virtualization environment so that build files 124 are capable of accessing them.

In an embodiment, each virtualization environment produces a unique executable package 128 using service files 122, system packaging 124, and build files 126. The executable package 128 may be produced through performance of a build operation within the virtualization environment. As each virtualization environment executes a build on different service files 122, each virtualization environment produces a unique executable package 128. Each time a build is run in a particular virtualization environment 120, the same executable package 128 is produced. For example, the virtualization environment may be configured to build each executable package 128 at the same commit using the same version of service files 122. In an embodiment, each executable package 128 is produced in a compressed form. For example, the executable package 128 may be produced as a .tar file which combines a plurality of files of executable package 128 into a single archive file.

4. Preparing Files for Common Build Implementation

Figure 2:
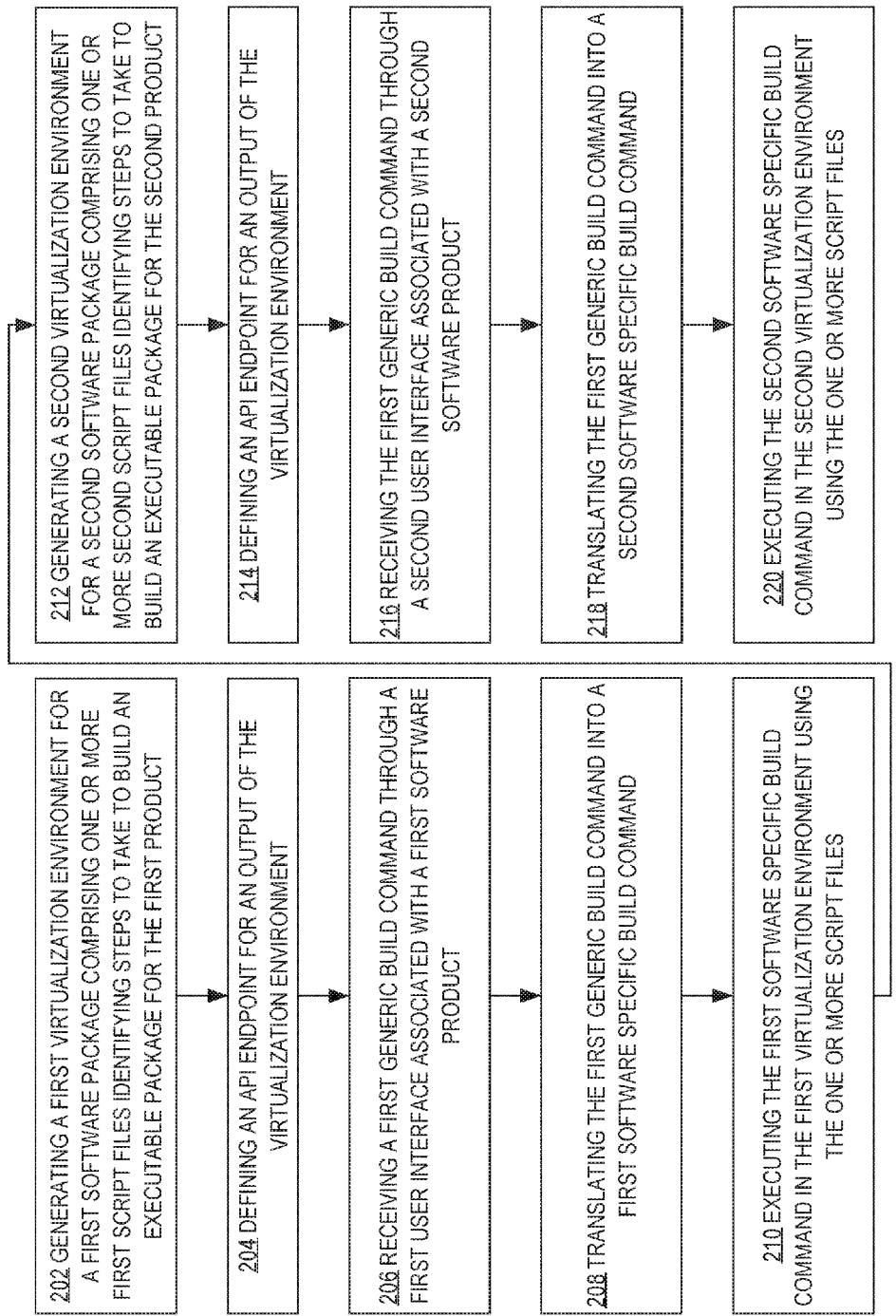
FIG. 2 depicts a method for implementing a common build system in a plurality of virtualization environments in order to build disparate software packages.

FIG. 2 depicts a method for implementing a common build system in a plurality of virtualization environments in order to build disparate software packages.

At step 202 a first virtualization environment for a first software package comprising one or more first script files identifying steps to take to build an executable package for the first product is generated. For example, virtualization environment 120(1) may be generated for delivering a first executable software package to a distributed computing environment. Generating the virtualization environment may comprise storing, in the virtualization environment, a copy of the desired software, files for packaging the desired software into a specification of the distributed computing environment, and files for building the desired software into an executable software package.

At step 204, an API endpoint is defined for an output of the virtualization environment. For example, a pseudo scripting language may be used to define an API endpoint for an executable software package that is built in the virtualization environment. The API endpoint may be configured to receive an archive file, such as a .tar file, that comprises a plurality of software files of an executable software package.

The same procedures that were performed for steps 202 and 204 are repeated for steps 212 and 214. Thus, in step 212, a second virtualization environment for a second software package is generated. The files in the second virtualization environment may overlap with the files in the first virtualization environment. For example, the build files and the files for packaging the desired software may be similar for each virtualization environment. The second virtualization environment may include a copy of a different desired software or different version of the same software. Additionally, some of the files in the second virtualization environment may be configured differently than files in the first virtualization environment. For example, project information for each software package may be added to a build support system based on specifics in a build system for the software package.

While step 212 is depicted, in the example of FIG. 2, as occurring after step 210, in additional and/or alternate embodiments, steps 212-220 are performed independently of steps 202-210. For example, the first and second virtualization environments may both be generated prior to execution of the first software specific build command. As another example, one or more of the steps in FIG. 2 may be performed in parallel with one or more other steps of FIG. 2. for example, multiple executable software packages may be built in separate virtualization environments at the same time.

At step 214, an API endpoint is defined for the output of the second virtualization environment. The API endpoint of the second virtualization environment allows for the exportation of the second executable software package.

5. Implementing the Common Build for Different Services

At step 206, a first generic build command is received through a first user interface associated with a first software product. For example, the distributed computing environment may include a software deployment product which allows deployment and management of products through a single system. The software deployment product may be used to install software onto a plurality of host computing devices. The software deployment product may also include a graphical user interface for initiating installation of software packages through different interfaces. For example, a first interface may relate to a first service while a second interface relates to a second service.

Each interface accepts common build commands and causes the common build commands to be executed in a respective virtualization environment. As each virtualization environment would contain the same build files, a generic build command can reference just the build files without needing to identify the particular software or conform to the specifications of the particular software that is being built.

At step 208, the first generic build command is translated into the first software specific build command. For example, the deployment software may identify a particular virtualization environment based on the interface that received the generic build command. Thus, if a first interface that is associated with the first software product receives the generic build command, the deployment software may send the generic build command to the first virtualization environment.

The first virtualization environment may be configured to execute a build of the first software product through the generalized build files. Thus, the generalized build files may be used to translate the generic build command into a first software specific build command that performs the build operations necessary to build the first software product in the first virtualization environment.

At step 210, the first software specific build command is executed in the first virtualization environment using the one or more script files. For example, the first virtualization environment may use a common build system to build the first software in the first virtualization environment. Building the file may include configuring the executable package so that it can meet the specifications for the deployment package. Building the file may also include downloading any additional dependencies and building any shared libraries necessary for the software to run. Additionally and/or alternatively, the additional software may be downloaded in advance and/or the necessary shared libraries may be built in advance of the software build.

The same steps may additionally be performed with respect to a second service and a second virtualization environment. At step 216, the first generic build command is received through a second user interface associated with a second software product. As the same common build system is being accessed for each software product, a generic build command may be used regardless of the software product or build requirements for the software product. Instead, builds for different products can be identified through different user interfaces. In an embodiment, the different interfaces comprise differences in a selection of a software product on a same interface. For example, a generic build interface may include a drop down menu for selecting the product to be installed. The first interface may thus comprise the generic build interface with a selection of the first software product and the second interface may comprise the generic build interface with a selection of the second software product.

At step 218, the generic build command is translated into a second software specific build command. For example, based on which interface receives the command, a computing system executing the software deployment product may identify the virtualization environment that corresponds to a service that is being installed. The generic build command may then be translated, either by the software deployment product or through the build files in the second virtualization environment, to a second software specific build command that causes performance of a build of the second software package in the second virtualization environment.

At step 220, the second software specific build command is executed in the second virtualization using the one or more script files. As with the first software, the second software may be built in the second virtualization environment using a common build system. By performing each build operation in a separate virtualization environment, the software deployment product allows a user to be agnostic as to the needs of a software package that is being built. Additionally, added virtualization scripting allows the system to remove any issues of dependencies on particular build systems or services. From the host computing device perspective, the same build command is entered into each interface, but a different output is produced.

In an embodiment, the output of each virtualization environment is an archive file that comprises a plurality of files which make up an executable package for the software built in the virtualization environment. The executable packages allow the host computing device to use the software as if the software had been built on the host computing device. The executable packages may be made available to the host computing device through the software deployment product.

Embodiments described herein allow a software deployment package to produce executable software packages from disparate sources despite differences in how the software is built. Because the software is built in a virtualization environment, the software development package is able to provide services through executable software packages built in the different virtualization environments. Additionally, as the services can be provided through a single software deployment package, the services can be configured to be accessed and implemented uniformly.

An additional benefit of the methods described herein is that they allow for the uniform generation and implementation of tests. For example, a host computing device or the virtualization environment may store one or more test libraries with dependency managers. The test libraries may define tests that can be performed on the built executable package. For example, a verification test may be defined which determines whether the archive filed produced through the build operation matches the specification for the software deployment package. As the disparate software packages are built using a common build system in order to produce a similar style of file, standardized test libraries allow performance of verification tests through a software deployment package where such tests would have had to be manually generated for each software package in prior systems.

6. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
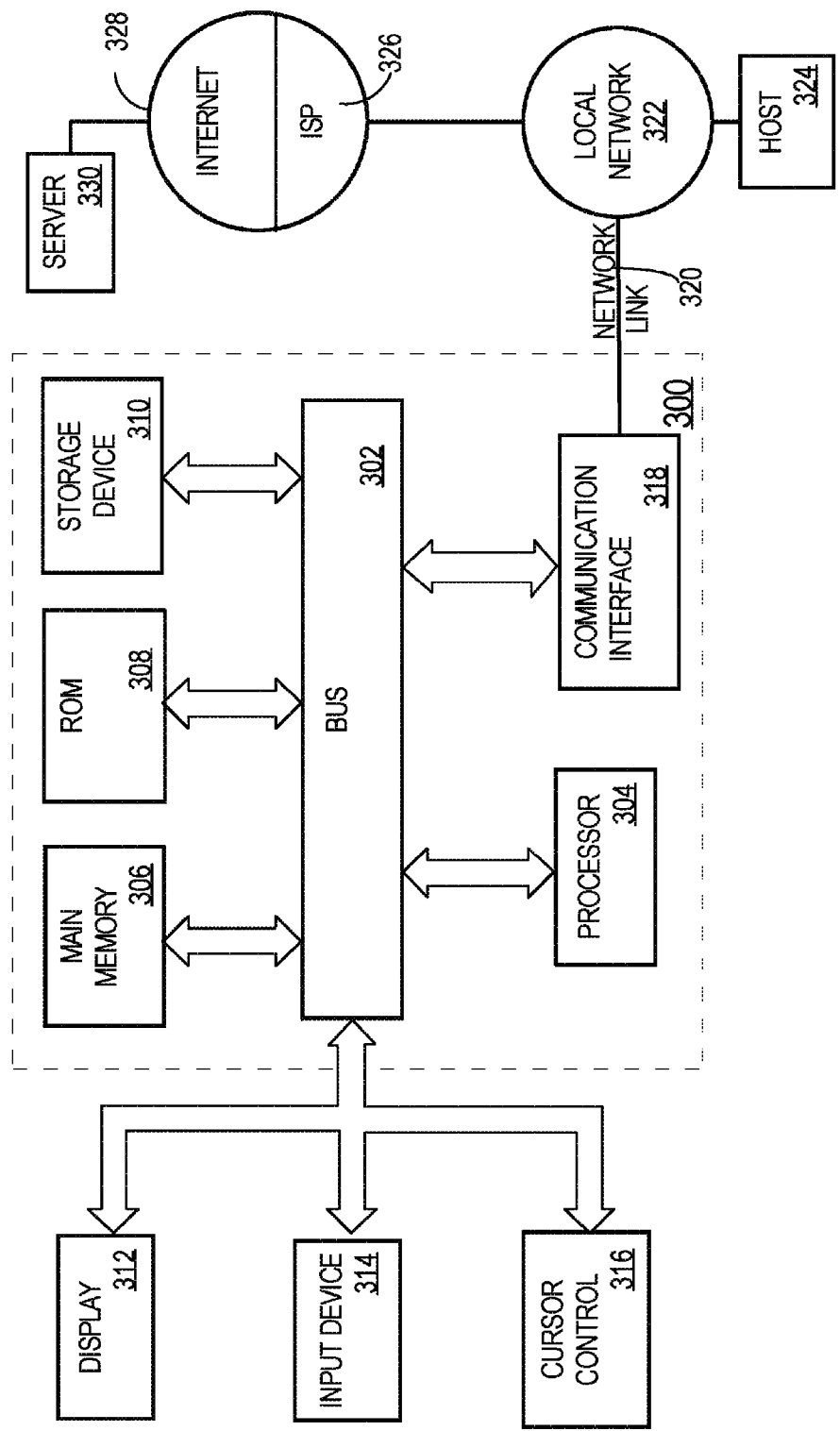
FIG. 3 is a block diagram that illustrates a computer system upon which an embodiment may be implemented.

For example, FIG. 3 is a block diagram that illustrates a computer system 300 upon which an embodiment may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

7. Implementation Example—Basic Software System

Figure 4:
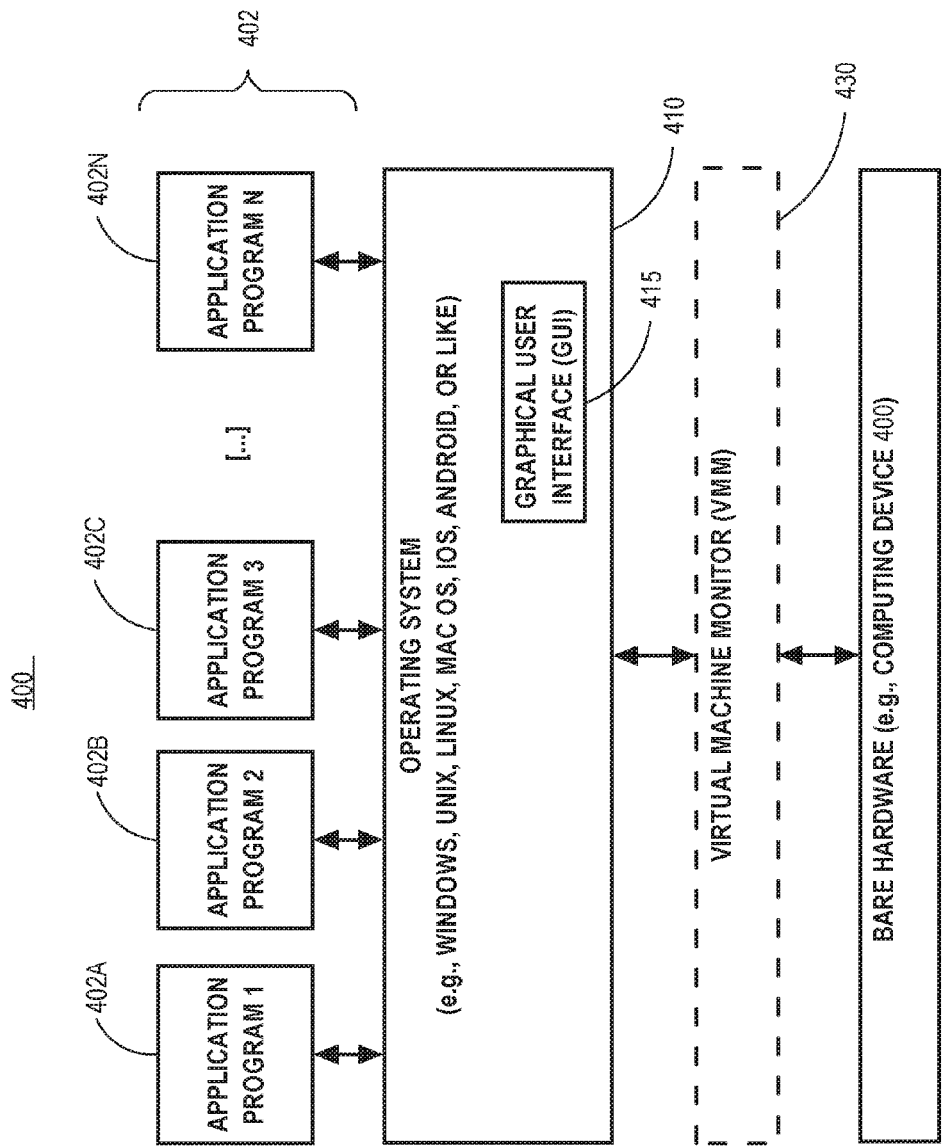
FIG. 4 is a block diagram of a basic software system that may be employed for controlling the operation of a computing device.

FIG. 4 is a block diagram of a basic software system 400 that may be employed for controlling the operation of computing device 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing device 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on device 400 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of device 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the device 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of device 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

8. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
generating a first virtualization environment for a first software product comprising one or more first script files that identify executable steps for computer execution to build an executable package for the first software product;
defining an application program interface (API) endpoint for an output of the first virtualization environment;
receiving, through a first user interface associated with the first software product, a first generic build command, wherein the first generic build command is usable to cause building with any of a plurality of different programming languages;
translating the first generic build command into a first software specific build command;
using the one or more first script files, executing the first software specific build command in the first virtualization environment;
generating a second virtualization environment for a second software product comprising one or more second script files identifying steps to take to build an executable package for the second software product;
defining an API endpoint for an output of the second virtualization environment;
receiving, through a second user interface associated with the second software product, the first generic build command;
translating the first generic build command into a second software specific build command;
using the one or more second script files, executing the second software specific build command in the second virtualization environment;
wherein the method is performed using one or more processors.

2. The method of claim 1, further comprising:
in response to executing the first software specific build command in the first virtualization environment, converting an output of the executed first software specific build command into a first archive file and providing the first archive file to a host computing device;
in response to executing the second software specific build command in the second virtualization environment, converting an output of the executed second software specific build command into a second archive file and providing the second archive file to the host computing device.

3. The method of claim 1,
wherein the first software specific build command is executed at a particular commit;
wherein the method further comprises:
receiving through the first user interface associated with the first software product, a second generic build command;
translating the second generic build command into the first software specific build command;
using the one or more script files, executing the first software specific build command in the first virtualization environment at the particular commit.

4. The method of claim 1, further comprising;
in response to executing the first software specific build command in the first virtualization environment, configuring an output of the executed first software specific build command to be compliant with a specification of a software deployment product;
in response to executing the second software specific build command in the second virtualization environment, configuring an output of the executed second software specific build command to be compliant with the specification of the software deployment product.

5. The method of claim 1, wherein the first user interface and the second user interface are displayed on a host computing device separate from the first virtualization environment and the second virtualization environment.

6. The method of claim 5, further comprising:
identifying the first virtualization environment based on the first user interface and sending the first generic build command received through the first user interface to the first virtualization environment;
identifying the second virtualization environment based on the second user interface and sending the generic build command received through the first user interface to the second virtualization environment.

7. A system comprising:
one or more processors;
one or more storage media storing:
a first virtualization environment for building a first software package, the first virtualization environment comprising:
one or more first service files for a first software product;
build instructions for building software products in a virtualization environment;
system packaging instructions for configuring a software product to meet one or more specifications of a software deployment product; and
an API endpoint for outputting an executable software package built from the one or more first service files using the build instructions;
a second virtualization environment for building a second software package, the second virtualization environment comprising:
one or more second service files for a second software product;
the build instructions for building software products in a virtualization environment;

the system packaging instruct configuring a software product to meet one or more specifications of the software deployment product; and an API endpoint for outputting an executable software package built from the one or more second service files using the build instructions.

8. The system of claim 7,
wherein the first virtualization environment further comprises:
generic test instructions which, when executed by the one or more processors, cause testing an output of the first virtualization environment;
wherein the second virtualization environment further comprises:
the generic test instructions which, when executed by the one or more processors, cause testing an output of the second virtualization environment.

9. The system of claim 7, wherein the first virtualization environment and the second virtualization environment are stored on separate server computing devices.

10. The system of claim 7, wherein the first virtualization environment and the second virtualization environment are stored on the same server computing device.

11. A system comprising:
one or more processors;
one or more storage media;
one or more instructions stored in the storage media which, when executed by the one or more processors, cause performance of:
generating a first virtualization environment for a first software product comprising one or more first script files that identify executable steps for computer execution to build an executable package for the first software product;
defining an application program interface (API) endpoint for an output of the first virtualization environment;
receiving, through a first user interface associated with the first software product, a first generic build command, wherein the first generic build command is usable to cause building with any of a plurality of different programming languages;
translating the first generic build command into a first software specific build command;
using the one or more first script files, executing the first software specific build command in the first virtualization environment;
generating a second virtualization environment for a second software product comprising one or more second script files identifying steps to take to build an executable package for the second software product;
defining an API endpoint for an output of the second virtualization environment;
receiving, through a second user interface associated with the second software product, the first generic build command;
translating the first generic build command into a second software specific build command;

using the one or more second script files, executing the second software specific build command in the second virtualization environment.

12. The system of claim 11, wherein the instructions, when executed by the one or more processors, further cause performance of:
in response to executing the first software specific build command in the first virtualization environment, converting an output of the executed first software specific build command into a first archive file and providing the first archive file to a host computing device;
in response to executing the second software specific build command in the second virtualization environment, converting an output of the executed second software specific build command into a second archive file and providing the second archive file to the host computing device.

13. The system of claim 11,
wherein the first software specific build command is executed at a particular commit;
wherein the instructions, when executed by the one or more processors, further cause performance of:
receiving through the first user interface associated with the first software product, a second generic build command;
translating the second generic build command into the first software specific build command;
using the one or more script files, executing the first software specific build command in the first virtualization environment at the particular commit.

14. The system of claim 11, wherein the instructions, when executed by the one or more processors, further cause performance of:
in response to executing the first software specific build command in the first virtualization environment, configuring an output of the executed first software specific build command to be compliant with a specification of a software deployment product;
in response to executing the second software specific build command in the second virtualization environment, configuring an output of the executed second software specific build command to be compliant with the specification of the software deployment product.

15. The system of claim 11, wherein the first user interface and the second user interface are displayed on a host computing device separate from the first virtualization environment and the second virtualization environment.

16. The system of claim 15, wherein the instructions, when executed by the one or more processors, further cause performance of:
identifying the first virtualization environment based on the first user interface and sending the first generic build command received through the first user interface to the first virtualization environment;
identifying the second virtualization environment based on the second user interface and sending the generic build command received through the first user interface to the second virtualization environment.

* * * * *